(12) United States Patent
Humes, Sr.

(10) Patent No.: US 12,059,605 B2
(45) Date of Patent: Aug. 13, 2024

(54) GOLF BAG BUMPER

(71) Applicant: Nathan Howard Humes, Sr., Fort Mill, SC (US)

(72) Inventor: Nathan Howard Humes, Sr., Fort Mill, SC (US)

(73) Assignee: BU-nique Brands LLC, Fort Mill, SC (US)

( * ) Notice: Subject to any disclaimer, the term of this patent is extended or adjusted under 35 U.S.C. 154(b) by 0 days.

(21) Appl. No.: 17/659,731

(22) Filed: Apr. 19, 2022

(65) Prior Publication Data

US 2022/0331671 A1 Oct. 20, 2022

Related U.S. Application Data

(60) Provisional application No. 63/201,213, filed on Apr. 19, 2021.

(51) Int. Cl.
| | | |
|---|---|---|
| *A63B 55/00* | (2015.01) | |
| *B29C 44/02* | (2006.01) | |
| *B29C 44/56* | (2006.01) | |
| *B29L 31/00* | (2006.01) | |

(52) U.S. Cl.
CPC ............ *A63B 55/408* (2015.10); *B29C 44/02* (2013.01); *B29C 44/5627* (2013.01); *A63B 2209/00* (2013.01); *B29L 2031/7128* (2013.01)

(58) Field of Classification Search
CPC ... A63B 55/408; A63B 2209/00; B29C 44/02; B29C 44/5627; B29L 2031/7128
USPC ...................................................... 206/315.6
See application file for complete search history.

(56) References Cited

U.S. PATENT DOCUMENTS

| | | | |
|---|---|---|---|
| 5,528,813 A * | 6/1996 | Biafore, Jr. ............ | A63B 55/00 |
| | | | 206/315.8 |
| 6,158,581 A | 12/2000 | Hong | |
| 6,315,117 B1 | 11/2001 | Han | |
| 6,412,734 B2 | 7/2002 | Lin | |
| 6,682,027 B1 | 1/2004 | Chang | |
| 6,938,762 B2 | 9/2005 | Cheng | |
| 7,481,311 B1 | 1/2009 | Old | |
| 9,474,949 B2 | 10/2016 | Campbell et al. | |
| 11,123,616 B2 | 9/2021 | Martell et al. | |
| 2004/0200746 A1 * | 10/2004 | Kang .................. | G09F 23/0066 |
| | | | 206/315.3 |
| 2005/0284781 A1 | 12/2005 | Te-Pin | |
| 2007/0152004 A1 | 7/2007 | Rooney | |
| 2009/0205760 A1 | 8/2009 | Bettinardi | |
| 2010/0320105 A1 * | 12/2010 | Aubery .................. | A63B 55/57 |
| | | | 206/315.7 |
| 2014/0034527 A1 | 2/2014 | Anderson | |
| 2015/0014196 A1 | 1/2015 | Hargis | |
| 2021/0146208 A1 | 5/2021 | Burgess et al. | |

(Continued)

*Primary Examiner* — Don M Anderson
*Assistant Examiner* — Jessica Kavini Tamil
(74) *Attorney, Agent, or Firm* — Dunlap Bennett & Ludwig, PLLC

(57) ABSTRACT

A golf bag bumper dimensioned and adapted to removably coupled along a bottom portion of the golf bag, wherein the golf bag bumper is adapted to absorb the energy of impacts, minimizing repair costs to the golf bag and to objects that collides with the energy-absorbing bumper. The golf bag bumper would also enable an aesthetic and/or branding opportunity to the bottom of the golf bag while providing this protection.

15 Claims, 4 Drawing Sheets

(56) References Cited

U.S. PATENT DOCUMENTS

2022/0001254 A1  1/2022  Martell et al.
2022/0111272 A1* 4/2022  Martell ............... A63B 55/404

\* cited by examiner

GOLF BAG BUMPER

CROSS-REFERENCE TO RELATED APPLICATION

This application claims the benefit of priority of U.S. provisional application No. 63/201,213, filed 19 Apr. 2021, the contents of which are herein incorporated by reference.

BACKGROUND OF THE INVENTION

The present invention relates to golf bag accessories and, more particularly, a golf bag bumper that prevents car dings when loading and unloading the golf bag.

Golf bags are a necessary part of playing the game of golf. Golf bags have a sturdy construction to protect (possibly) expensive golf clubs they carry. This construction makes golf bags bulky and unwieldy. Unfortunately, when moving a golf bag, a golfer may knock the bottom of their golf bag (the portion of the golf bag furthest away from themselves) against an object; for instance, when loading and unloading the golf bag from a vehicle, the bottom of the golf bag may collide with the vehicle. These collisions can damage the golf bag as well as ding the vehicle.

As can be seen, there is a need for a golf bag bumper dimensioned and adapted to removably coupled along a bottom portion of the golf bag, wherein the golf bag bumper is adapted to absorb the energy of impacts, minimizing repair costs to the golf bag and to objects that collide with the energy-absorbing bumper. Thereby preventing dings to a vehicle during loading and unloading the golf bag. The bumper would also enable an aesthetic and/or branding opportunity to the bottom of the golf bag while providing this protection. Furthermore, the present invention also provides a market penetrating product in the golf sector, wherein enthusiasts are clamoring for accessories.

The golf bag bumper would be a market penetrating product, whereas an equal does not currently exist. Prior art consists of a manufactured golf bag base integrated to the remainder of the golf bag and lacking the functionality and structure of the present invention. In contrast, the present invention would be available post manufacture and would slide on the end of a manufactured golf bag(s) similar to a cap or shoe with tightening components, with unique design to allow for pivoting and maneuvering.

The golf bag bumper would prevent scratches and dings to a vehicle when loading and unloading the golf bag from a vehicle, as well as other patrons' vehicles when transporting the golf bag. Its one-piece construction would be comprised of collision absorbing material that hugs the golf bag base and allows for freedom of movement and expansion, while repelling against elements such as rain, surface water, and earth materials (dirt, mud, sand, gravel).

The golf bag bumper would provide a risk management solution, preventing/eliminating high costs associated with vehicle repairs and liability associated with physical damage to others owned property. Prior art is made of sturdy, thick elements that otherwise cause surface damage to vehicles, walls, anything it comes in contact with, thereby leading to visible defects.

The golf bag bumper would be formed from a model of the golf bag base(s) and may be painted/designed for aesthetic and/or branding purposes for an industry where its consumers clamor for gadgets and expressive elements that advertise and protect their investments (i.e., clubs, bags, cars, homes, others property).

The golf bag bumper would be easily removable, which sets it apart from any prior art, which does not allow for removal, as the integrity of the golf bag would be compromised and deemed useless. Consumers within this industry, change equipment regularly. The golf bag bumper would provide a sustainable solution to the concerns mentioned herein, regardless of any new purchases.

SUMMARY OF THE INVENTION

In one aspect of the present invention, a method of a golf bag bumper, the method including the following: forming a mold based on a base of a golf bag; filling the mold with energy-absorbing foam so that a tubular sidewall is formed, wherein an inner circumference of the tubular sidewall is substantially coextensive with a portion of the base; and cutting an entry slot out of a portion of the tubular sidewall, wherein filling the mold forms a planar base from which the tubular sidewall extends orthogonally from along a periphery of the planar base.

In another aspect of the present invention, the method of improving a base of a golf bag, the method including the following: sliding an energy-absorbing material over said base, wherein the energy-absorbing material protrudes beyond a substantial portion of a periphery of the base, wherein the energy-absorbing material has a cavity defined in part by a tubular sidewall, wherein the cavity is dimensioned to frictionally engage at least two opposing portions of said base, and wherein an entry slot is provided in the tubular sidewall, wherein the entry slot is dimensioned to slidably receive a girth of said base.

In yet another aspect of the present invention, the golf bag bumper for a golf bag, the golf bag bumper includes the following: a cavity defined by energy-absorbing foam in a form of a sidewall, wherein an inner diameter of the sidewall is dimensioned to be coextensive with a girth of a base of the golf bag; and an entry slot forming in the sidewall, wherein the entry slot is defined by two opposing colinear cutout faces, wherein the energy-absorbing foam is coarse and so configured to provide frictional engagement against the girt of the golf bag, wherein a linear length the entry slot is defined by along a plane, wherein the plane includes opposing entry faces of the sidewall, and wherein each entry face has a height between one and a half inches and three inches, and wherein each entry face has a width between one half inch and one and one half an inch, and wherein the sidewall if generally tubular with two open ends or wherein a planar base defines a lower portion of the cavity.

These and other features, aspects and advantages of the present invention will become better understood with reference to the following drawings, description and claims.

DETAILED DESCRIPTION OF THE INVENTION

Figure 1:
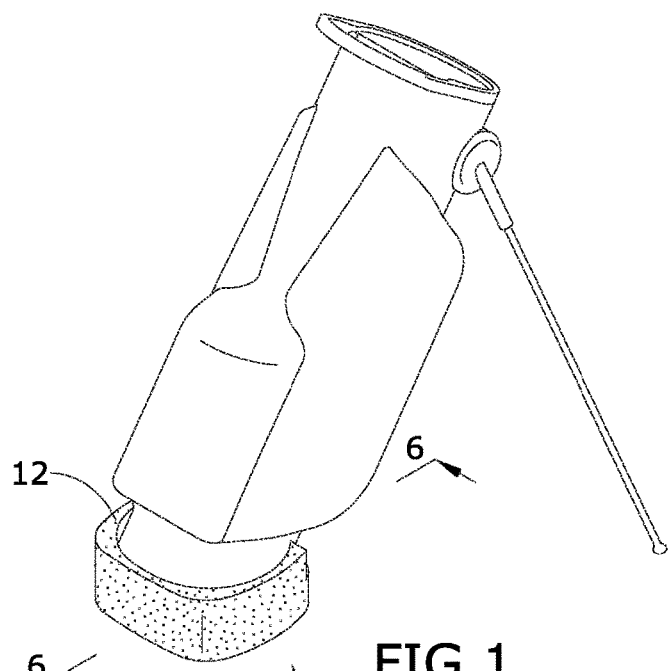
FIG. 1 is a perspective view of an exemplary embodiment of the present invention, shown in use.
Figure 2:
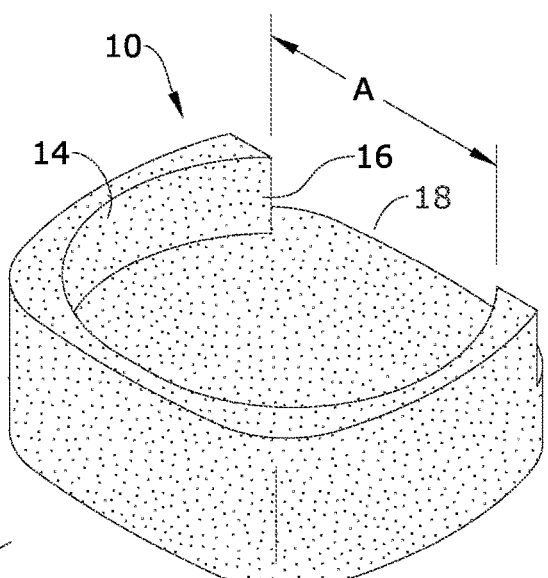
FIG. 2 is a top front-right perspective view of an exemplary embodiment of the present invention.
Figure 3:
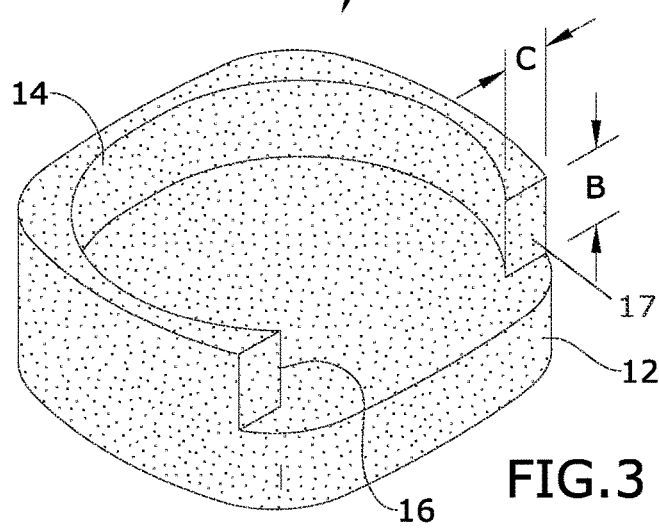
FIG. 3 is a top left-rear perspective view of an exemplary embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a golf bag bumper dimensioned and adapted to removably coupled along a bottom portion of the golf bag, wherein the golf bag bumper is adapted to absorb the energy of impacts, minimizing repair costs to the golf bag and to objects that collides with the energy-absorbing bumper. The golf bag bumper would also enable an aesthetic and/or branding opportunity to the bottom of the golf bag while providing this protection.

Referring now to FIGS. 1 through 8, the present invention may include a golf bag bumper 10, 30 made of impact-absorbing material. As a result, when loading and unloading the golf bag 20 from a vehicle, dings and other damage is minimized when the bottom of the golf bag 20 collides with the vehicle as the golf bag bumper 30 intervenes.

The golf bag bumper 10, 30 may be made of foam or other impact-absorbing material. The material may be formed from a mold of the base 22 of the golf bag 20, thereby forming a cavity within the golf bag bumper 10, 30 dimensioned to snugly engage the base 22 during use. The above process also simplifies construction such that a manufacturer may pour or injection mold the impact-absorbing foam into said mold, forming a unitary construction. The resulting golf bag bumper 10 may be painted/designed for aesthetic and/or branding purposes. A portion of the sidewall that defines said cavity may be cut away, defining an entry slot 18 or 38.

The golf bag bumper 10 may have a sidewall or raised lip portion 14 extending from a periphery of a planar base 12, thereby defining a recess in which the golf bag base may be snugly engaged. The planar base 12 provides a footing for at least a portion of the base 22 of the golf bag 20. The sidewall or raised lip portion 14 may be discontinuous at the location of an entry slot 18. The entry slot 18 may be dimensioned and adapted to slidably receive the girth of a base 22 of the golf bag 20. An entry distance 'A' between opposing cutout walls 16, 36 may range between approximately 4.5 inches and 9.5 inches. The entry distance 'A' is measured coplanar with the planar base 12. A face 17 of the cutout walls 16, 26 may have a vertical distance (height) 'B' ranging between 1.5 inches and three inches. The face 17 of the cutout walls 16, 26 may have a horizontal distance (width) 'C' ranging between approximately 0.5 inch and 1.5 inches. The horizontal distance 'C' may be parallel with the entry distance 'A'.

Figure 7:
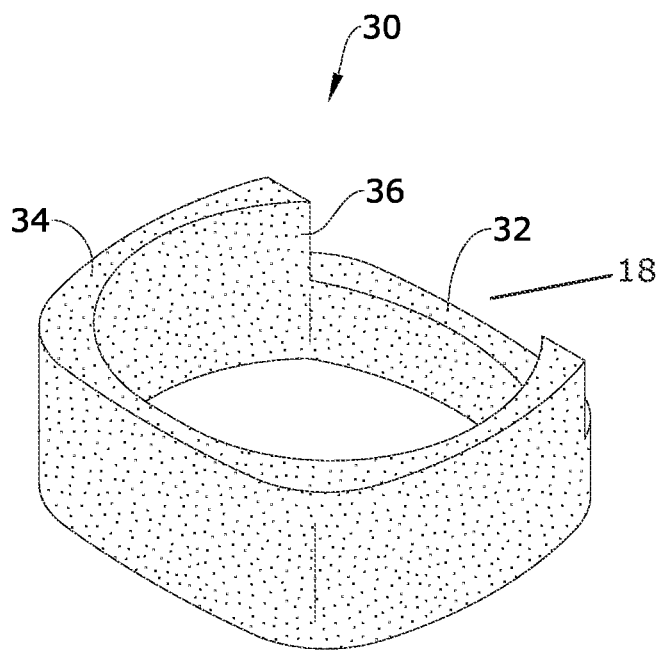
FIG. 7 is a top front-right perspective view of another exemplary embodiment of the present invention.
Figure 8:
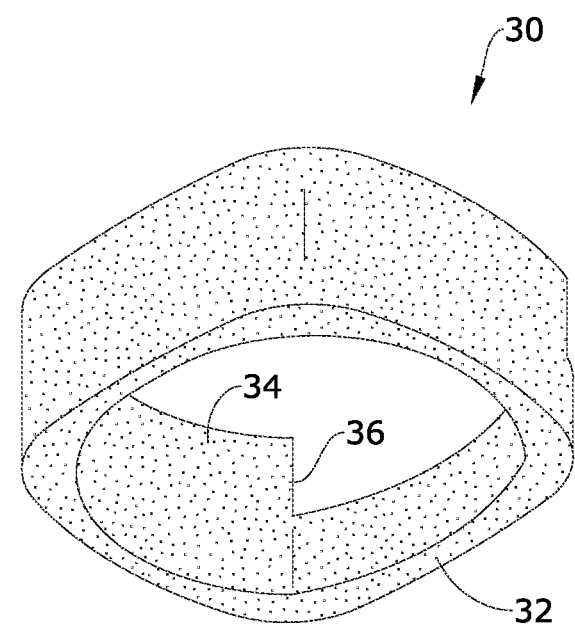
FIG. 8 is a bottom front-right perspective view of another exemplary embodiment of the present invention.

In certain embodiments, the sidewall 34 is tubular and open on both ends, like a sleeve. Here, the entry slot 38 is a cutout of the sidewall 34, whereby the entry slot 38 defines a lower wall portion 32, as illustrated in FIGS. 7 and 8. In certain embodiments, the present invention may provide functional tightening components. The foam that comprises the golf bag bumper 10, 30 is coarse, which provides an organic tightening feature through frictional engagement with the golf bag base 22.

Figure 6:
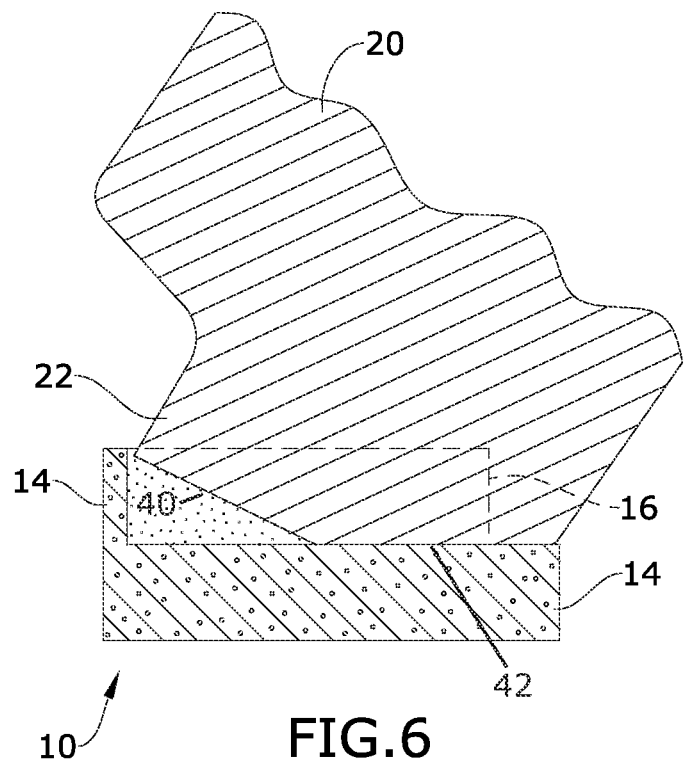
FIG. 6 is a section view of an exemplary embodiment of the present invention, taken along line 6-6 in FIG. 1.

A method of using the present invention may include the following. The golf bag bumper 10 or 30 disclosed above may be provided. The user would slide the golf bag bumper 10 on the base 22 of the golf bag 20. In the embodiments where the bumper 10 has the planar base 12, the base 22 of the golf bag 20 may slide laterally through the entry slot 18 until the golf bag base 22 abuts or is adjacent to a rear portion of the bumper, as illustrated in FIG. 6. The inner diameter of the sidewalls 14, 34 may be dimensioned and adapted to form a snug fit with the engaged portion of the golf bag base 22, frictionally engaging the golf bag base 22, preventing the golf bag bumper 10 from getting dislodged inconveniently therefrom. The inner diameter may range approximately between five inches and fifteen inches or otherwise be dimensioned to be substantially coextensive with a diameter or concentric with a footprint of at least a portion of the golf bag base, thereby ensuring frictional engagement between the two bodies (golf bag bumper 10 and golf bag base 22).

Figure 4:
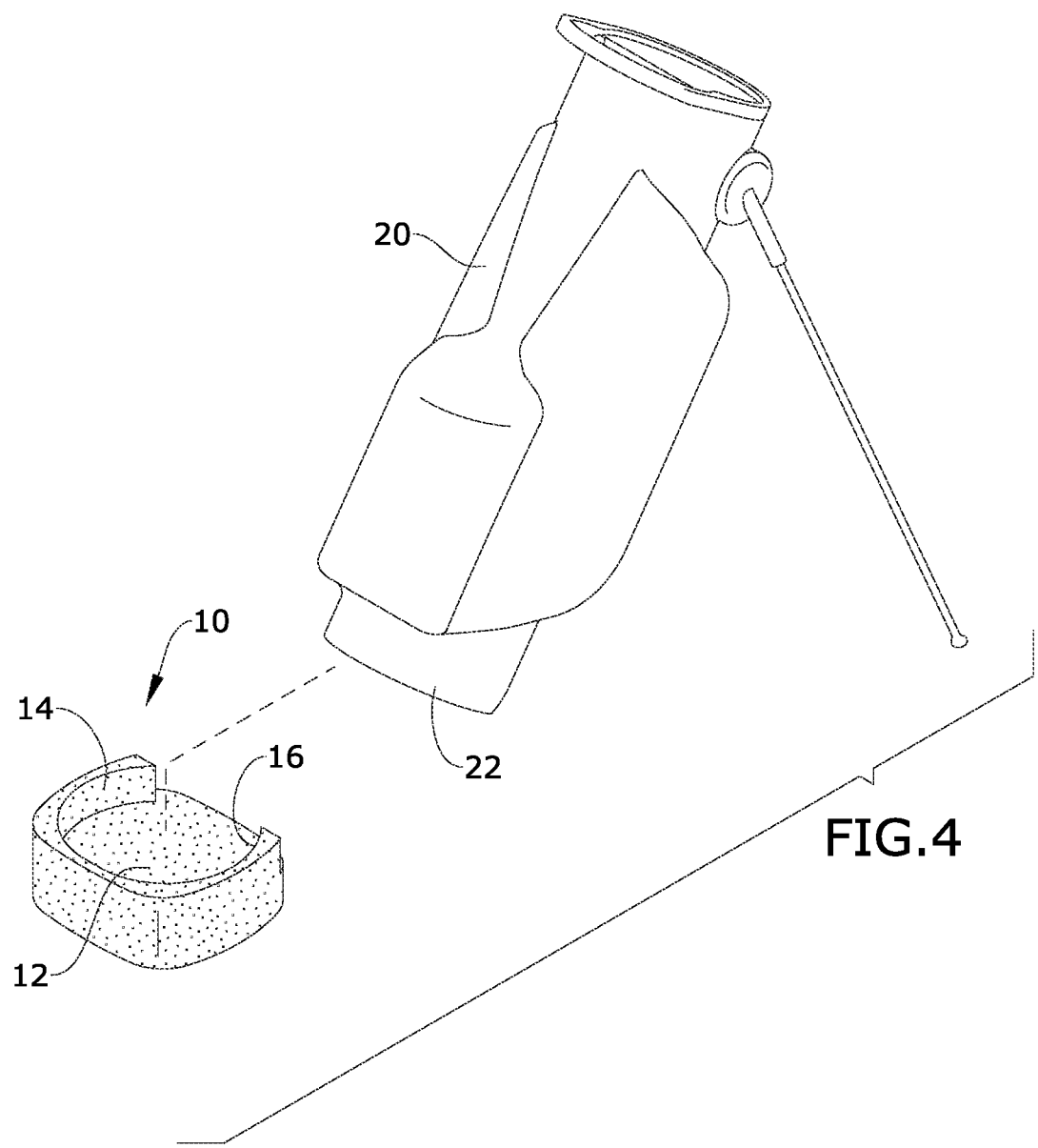
FIG. 4 is an exploded top front-right perspective view of an exemplary embodiment of the present invention, illustrating engagement/disengagement conditions.
Figure 5:
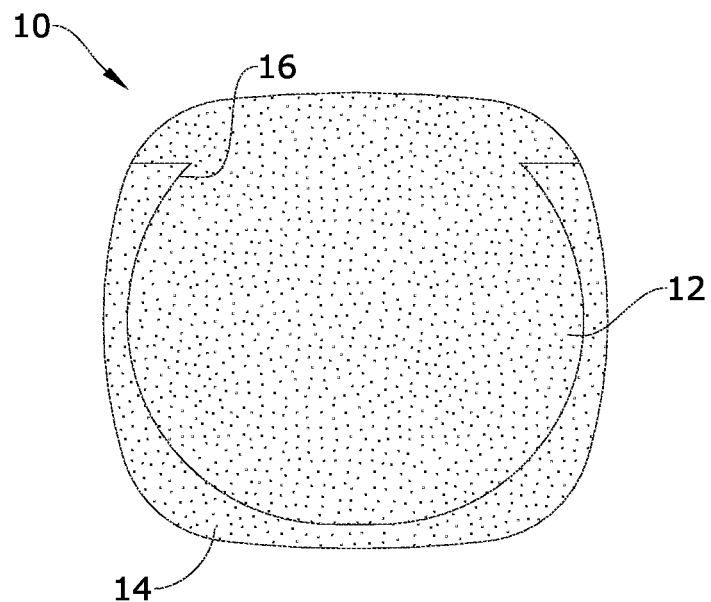
FIG. 5 is a top plan view of an exemplary embodiment of the present invention.

The golf bag base 22 may have a rear planar portion 40 and an upward sloping surface 42, wherein the sloping surface 42 is seated on the planar base 12 of the golf bag bumper 10, in an engaged condition, as illustrated in FIG. 6. To remove the golf bag 20, the golf bag bumper 10 is slid so that the rear planar portion 40 of the golf bag 20 moves, relatively, toward the entry slot 18 to a disengaged condition, as illustrated in FIG. 4.

In the embodiments where there is no planar base 12, the golf bag bumper 10 may be slid over the golf bag base 22, like a crown would receive a head. Again, the frictional engagement of the inner circumference of the sidewalls 34 against the outer periphery of at least a portion of the golf bag base 22 would prevent the golf bag bumper 30 from getting easily dislodged.

A method of using the present invention would include a user, when planning on carrying the golf bag 20, sliding the golf bag bumper 10 or 30 on the golf club base 22 so as to form a frictionally engaged condition. Then the user may feel confident that, when loading and unloading the golf bag 20 into and out of a vehicle, contact between the two objects would not cause damage to either. Subsequent use, the user may remove the golf bag bumper 10, 30 so that the golf bag 20 may be more easily stored.

As used in this application, the term "about" or "approximately" refers to a range of values within plus or minus 10% of the specified number. And the term "substantially" refers to up to 90% or more of an entirety. Recitation of ranges of values herein are not intended to be limiting, referring instead individually to any and all values falling within the range, unless otherwise indicated, and each separate value within such a range is incorporated into the specification as if it were individually recited herein. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments. In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A method of making a golf bag bumper for snugly fitting to
a base of a golf bag, the method comprising:
filling a mold, the mold modeled on said base, with energy-absorbing foam so that a sidewall is formed around a perimeter of a planar surface, wherein an inner circumference of the sidewall is substantially coextensive with an outer periphery of said base; and
cutting an entry slot out of a portion of the sidewall so that a first portion of the planar surface is circumscribed by the cut sidewall and a second portion of the planar surface is beyond of the cut sidewall, wherein the first and second portions of the planar surface are continuous with each other, and wherein the entry slot has a linear length along the planar surface at a transition between the first and second portions of the planar surface, wherein the linear length is dimensioned so that both an entire girth of said base is laterally receivable through the entry slot and the sidewall frictionally engages said base when so recieved wherein a forward portion of said base protrudes through the entry slot while making direct, unintermediated contact simultaneously with the first and second portions of the planar surface, thereby providing a bumper for said base.

2. The method of claim 1, wherein the linear length is approximately four and a half inches to nine and a half inches.

3. The method of claim 1, wherein two opposing ends of an inner surface of the sidewall frictionally engage two opposing portions of said base, respectively.

4. The method of claim 3, wherein two opposing side edges of the entry slot are defined by the two opposing ends of the inner surface of the sidewall, wherein the two side edges define an entry distance of the entry slot, wherein the entry distance is dimensioned to laterally slidably receive the entire girth of said base.

5. The method of claim 4, wherein a lower edge of the entry slot is defined by the planar surface.

6. The method of claim 1, wherein the direct, unintermediated contact between the forward portion of said base and the planar surface both aft and fore the entry slot.

7. The method of claim 6, wherein the direct, unintermediated contact between the forward portion of said base and the planar surface both aft and fore the entry slot is uninterrupted therebetween.

8. A method of improving a base of a golf bag, the method comprising:
providing an energy-absorbing material having a substantially continuous planar surface coextensive with an upper surface of the energy-absorbing material but for a sidewall perpendicularly extending from a perimeter of the upper surface, wherein a discontinuity of the sidewall defines an entry slot wherein the substantially continuous planar surface defines a lower edge of the entry slot;
removably attaching the energy-absorbing material to said base by way of laterally sliding an entire girth of said base through the entry slot until a rear portion of said base is circumscribed by the sidewall, the sidewall frictionally engages the girth of said slid-in base, and a forward portion of said base protrudes through the entry slot, wherein the forward portion makes direct, unintermediated contact with the substantially continuous planar surface, thereby providing a bumper for said base.

9. The method of claim 8, wherein two opposing ends of an inner surface of the sidewall frictionally engage two opposing portions of said base, respectively.

10. The method of claim 9, wherein two opposing side edges of the entry slot are defined by the two opposing ends of the inner surface of the sidewall, wherein the two opposing ends of the inner surface of the sidewall frictionally engage said girth of the slid-in base, and wherein the two side edges define an entry distance of the entry slot, wherein the entry distance is dimensioned to laterally slidably receive the entire girth of said base.

11. The method of claim 10, wherein the entry distance is between approximately four and a half inches to nine and a half inches.

12. The method of claim 8, wherein the direct, unintermediated contact between the forward portion of said base and the substantially continuous planar surface both aft and fore the entry slot.

13. The method of claim 12, wherein the direct, unintermediated contact between the forward portion of said base and the substantially continuous planar surface both aft and fore the entry slot is uninterrupted therebetween.

14. A golf bag bumper for a golf bag, the golf bag bumper comprising:
a unitary energy-absorbing foam having an upper portion consists essentially of;
a planar surface; and
a sidewall, wherein the sidewall circumscribes an outer perimeter of the upper portion but for a discontinuity in the sidewall; and
the discontinuity defines opposing side edges of an entry slot, which in turn defines an entry distance of the entry slot while the planar surface defines a lower edge of the entry slot, wherein the entry distance is dimensioned to laterally receive an entire girth of a base of the golf bag, and wherein the location of the discontinuity is configured so that a rear portion of said base is circumscribed by the sidewall while a front portion of said base is in direct unintermediated contact with a first portion of the planar surface aft the discontinuity and a second portion of the planar surface that is fore the discontinuity.

15. The golf bag bumper of claim 14, wherein the direct, unintermediated contact between the forward portion of said base and the planar surface both aft and fore the entry slot is uninterrupted therebetween.

* * * * *